No. 766,657. PATENTED AUG. 2, 1904.
H. C. BALCH.
FRUIT PICKER.
APPLICATION FILED NOV. 28, 1903.
NO MODEL.

Witnesses
Edwin F. McKee
Chas. S. Hays.

Inventor
Herbert C. Balch
By Victor J. Evans
Attorney

No. 766,657. Patented August 2, 1904.

UNITED STATES PATENT OFFICE.

HERBERT C. BALCH, OF BENZONIA, MICHIGAN.

FRUIT-PICKER.

SPECIFICATION forming part of Letters Patent No. 766,657, dated August 2, 1904.

Application filed November 28, 1903. Serial No. 183,066. (No model.)

*To all whom it may concern:*

Be it known that I, HERBERT C. BALCH, a citizen of the United States, residing at Benzonia, in the county of Benzie and State of Michigan, have invented new and useful Improvements in Fruit-Pickers, of which the following is a specification.

This invention relates to fruit-pickers, and particularly that class which is applied to the body of a person engaged in picking fruit and adapted to be worn either when the operator is standing in upright position on the ground or when mounted on a ladder or other elevated support.

The primary object of the invention is to enable an operator to pick a greater quantity of fruit in a given time with less tiresome exertion and to afford convenient means for quickly depositing the fruit in a receptacle embodied in the organization of the improved picker.

A further object of the invention is to support and hold the arm of the operator in connection with the inlet means to the picker in such manner that expedition will result in the picking operation and the arm will be prevented from becoming tired and less bodily movement will be required to arrive at the result sought.

With these and other objects and advantages in view the invention consists in the construction and arrangement of the several parts, which will be fully hereinafter set forth.

Figure 1:
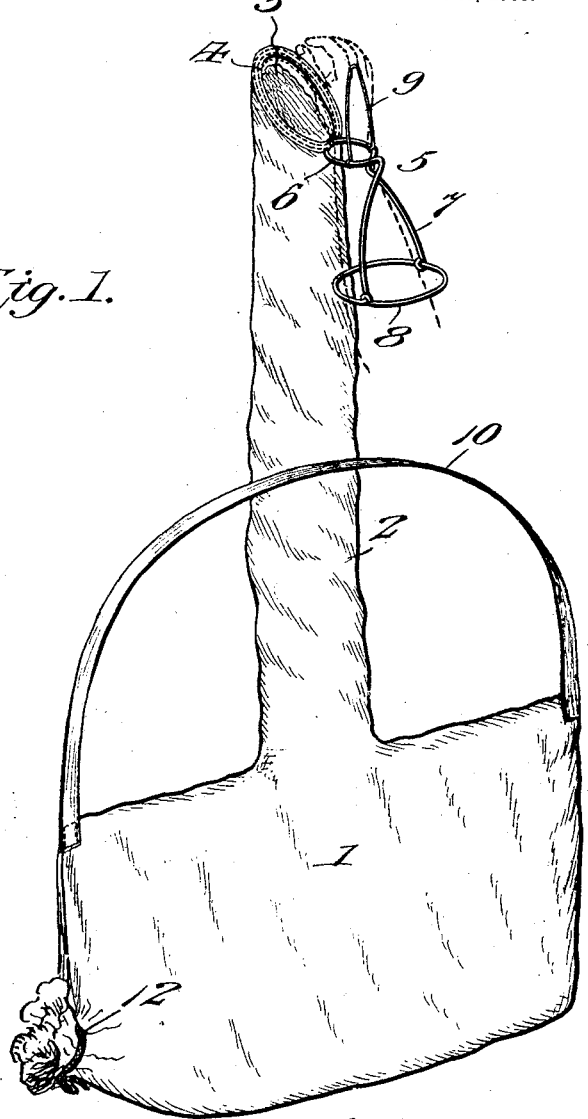
Figure 2:
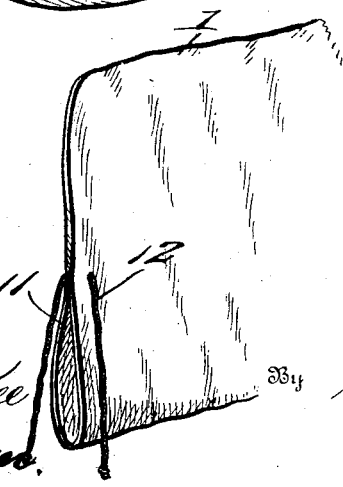

In the drawings, Figure 1 is a perspective view of a fruit-picker embodying the features of the invention and showing a hand and arm in dotted lines in operative position in relation thereto. Fig. 2 is a detail perspective view of a portion of the receptacle of the picker to illustrate how the fruit is relieved therefrom.

Similar numerals of reference are employed to indicate corresponding parts in the views.

The numeral 1 designates a receptacle or sack having an elongated chute 2 projected upwardly therefrom and provided with an upper inlet 3, surrounded by a suitable stiffening-ring 4, of wire or other material. The chute 2 will be of such length that the operator can draw the same upward the full reaching distance of the arm, and the mouth or inlet formed by the opening at the upper end of the chute is disposed obliquely for convenience in depositing the fruit therein. Connected to the lower part of the mouth or inlet of the chute 2 is an arm-support 5, consisting of an upper ring 6, attached to or forming a part of the ring 4 and having the wire used in forming the same bent downwardly and diverged to provide hangers 7, which are continuous with or secured to a lower ring 8. Rising from the outer portion of the ring 6 is a looped guard 9. The receptacle or sack 1 at the upper corners has a shoulder-strap 10 terminally attached thereto and of such length as to permit the said receptacle to depend a suitable distance downwardly over and bear upon the body of the operator. One end of the receptacle or sack 1 has the lower portion formed with an outlet-opening 11, with which a gathering-cord or analogous device 12 coöperates and is secured to the sack or receptacle adjacent to the upper terminal of the said outlet-opening.

In the use of the picker it is applied to the body of the operator with the strap 10 over one shoulder and a portion of one arm and a hand inserted through the rings 8 and 6, the hand being held between the mouth or inlet 3 and the guard 9, so that the fruit may be caught and deposited in the chute 2 without tiresome movement of the hand and arm. The chute will be disposed in different positions relatively to the movement of the arm of the operator, and by reason of the retention of the hand and arm in the manner stated the operator will not be required to indulge in tiresome bodily movements in order to deposit the fruit in the picker. It will be understood that prior to the beginning of the picking operation the outlet 11 of the sack or receptacle 1 will be closed and secured by the gathering-cord or analogous device 12. After the said receptacle becomes filled with fruit it may be readily relieved by untying the gathering-cord and releasing the outlet 11, and by tilting the opposite end of the said receptacle upwardly the fruit may readily be relieved therefrom without removing the picker from the person of the operator.

The improved device will be found exceptionally useful and is a material advantage over the class of pickers arranged on poles, especially in gathering fruits which have to be handled with care to avoid bruising or other injury. The arm and hand support used in connection with the chute will always be found to have many advantages in fruit-picking operations aside from those mentioned.

Changes in the proportions, dimensions, and minor details may be resorted to without in the least departing from the spirit of the invention.

Having thus fully described the invention, what is claimed as new is—

1. A fruit-picker consisting of a substantially rectangular sack having the bottom and one end completely closed and the opposite end near the bottom provided with an opening, a flexible chute extending upwardly from the center of the upper edge of the sack, the remaining part of said upper edge being closed, means for tying the opening in one end of the sack closed, and a shoulder-strap attached at its opposite ends to the terminals of the upper edge of the sack.

2. A fruit-picker, consisting of a sack with a flexible chute extending upwardly therefrom and provided with an inclined inlet-opening at its upper end, and a hand and arm support connected to the upper inlet end of the chute and consisting of an upper ring secured close to the lower edge of the inlet-opening, and a lower larger ring connected to the upper ring.

3. A fruit-picker, consisting of a sack with a flexible chute extending upwardly therefrom and provided with an inlet-opening at its upper end disposed at an angle of inclination, a hand and arm support connected to the upper inlet end of the chute and comprising an upper ring secured close to the lower terminal of the inlet-opening, a lower larger ring connected to the upper ring, and a guard projecting upwardly from the outer portion of the said upper ring.

4. A fruit-picker consisting of a substantially rectangular sack with one end and the bottom fully closed and the opposite end provided with an opening near the bottom, a single chute extending centrally from the upper edge of the sack, the remaining part of the said edge being fully closed, a supporting-strap for the sack attached at its opposite ends to the terminals of the said upper edge, and means held in connection with the inlet end of the chute for supporting the arm and hand of the operator.

In testimony whereof I affix my signature in presence of two witnesses.

HERBERT C. BALCH.

Witnesses:
   LLOYD W. BATES,
   C. E. CASE.